United States Patent
Hutter, III

(10) Patent No.: US 7,191,990 B2
(45) Date of Patent: Mar. 20, 2007

(54) ADJUSTABLE MOUNTING BRACKET

(75) Inventor: Charles G. Hutter, III, Carson City, NV (US)

(73) Assignee: Physical Systems, Inc., Carson City, NV (US)

(*) Notice: Subject to any disclaimer, the term of this patent is extended or adjusted under 35 U.S.C. 154(b) by 25 days.

(21) Appl. No.: 11/149,062

(22) Filed: Jun. 6, 2005

(65) Prior Publication Data

US 2005/0284995 A1  Dec. 29, 2005

Related U.S. Application Data

(60) Provisional application No. 60/581,902, filed on Jun. 23, 2004.

(51) Int. Cl.
  *F16B 1/00* (2006.01)
(52) U.S. Cl. ............... 248/229.12; 248/229.22; 248/228.3; 248/316.4
(58) Field of Classification Search .......... 248/229.12, 248/229.22, 228.3, 230.1, 231.41, 316.4, 248/205.3, 205.4
  See application file for complete search history.

(56) References Cited

U.S. PATENT DOCUMENTS

| 4,302,492 A | 11/1981 | Hutter, III |
| 4,338,151 A | 7/1982 | Hutter, III |
| 4,390,576 A | 6/1983 | Hutter, III |
| 4,668,546 A | 5/1987 | Hutter, III |
| 4,778,702 A | 10/1988 | Hutter, III |
| 4,822,656 A | 4/1989 | Hutter, III |
| 4,842,912 A | 6/1989 | Hutter, III |
| 5,013,391 A | 5/1991 | Hutter, III et al. |
| 5,112,015 A * | 5/1992 | Williams ............... 248/236 |
| 5,603,472 A | 2/1997 | Hutter, III |
| RE35,677 E * | 12/1997 | O'Neill ............... 248/551 |
| 5,704,747 A | 1/1998 | Hutter, III et al. |
| 5,822,918 A * | 10/1998 | Helfman et al. ............ 47/39 |
| 6,370,741 B1 * | 4/2002 | Lu ........................ 24/523 |
| 6,727,466 B2 | 4/2004 | Hutter, III |
| 6,773,780 B2 | 8/2004 | Hutter, III |
| 2005/0045785 A1 * | 3/2005 | Cohen ............... 248/214 |

* cited by examiner

Primary Examiner—Ramon O Ramirez
(74) Attorney, Agent, or Firm—Kelly Lowry & Kelley, LLP

(57) ABSTRACT

An adjustable mounting bracket for secure mounting as by adhesive attachment onto an exposed edge of a substrate, wherein the mounting bracket is adapted for quick and easy subsequent mounting of a selected structure such as tubing, wire bundles, etc., relative to the substrate. The adjustable mounting bracket includes a pair of slidably interfitting, generally L-shaped bracket members which cooperatively define a slidably overlying pair of mounting plates and an associated pair of slidably separable clamp jaw plates. The slidably interfitting mounting plates accommodate adjustable spaced-apart separation of the clamp jaw plates to seat firmly against opposed surfaces of the substrate edge, such as mounting onto a rib protruding from the substrate or mounting onto an inner diameter edge of an opening formed in the substrate.

27 Claims, 8 Drawing Sheets

ADJUSTABLE MOUNTING BRACKET

This application claims the benefit of U.S. Provisional Application 60/581,902, filed Jun. 23, 2004.

BACKGROUND OF THE INVENTION

This invention relates generally to mounting brackets and fixtures adapted for connection as by adhesive attachment to a supporting substrate, wherein the mounting bracket is adapted for quick and easy subsequent mounting of a selected structure such as tubing, wire bundles, etc., relative to the substrate. More particularly, this invention relates to an adjustable mounting bracket designed for secure mounting onto an exposed edge of a substrate, such as mounting onto a rib protruding from the substrate or mounting onto an inner diameter edge of an opening formed in the substrate.

Adhesive attachment assemblies or fixtures and related methods for securing an attachment component or element such as a patch, threaded screw, or other structure onto a supporting surface or substrate are generally known in the art. For example, it may necessary to apply a thin patch to the skin of an aircraft or to the hull of a boat to repair a hole therein. Alternately, it may be desirable to mount a threaded element, such as a threaded stud or nut, or other device onto a substrate such as an aircraft panel without requiring a hole to be made in the substrate, and wherein the threaded element or the like is adapted for subsequent mounting and/or supporting of a selected structure such as tubing, wire bundles, an electrical junction box, or the like. Exemplary attachment assemblies and related attachment fixtures of this general type are shown and described in U.S. Pat. Nos. 4,302,492; 4,338,151; 4,390,576; 4,668,546; 4,778,702; 4,822,656; 4,842,912; 5,013,391; 5,704,747; 5,603,472; 6,727,466 and 6,773,780, all of which are incorporated by reference herein. In these exemplary devices, the attachment component is urged or pressed against the substrate for at least some minimum time period to allow, for example, curing of an adhesive bonding agent such as a curable epoxy or the like to achieve a substantially optimized and secure bond with the substrate.

In other applications, the substrate may include an exposed edge having a position and size for convenient mounting of an attachment component used for subsequent mounting and supporting of tubing, wire bundles, electrical junction boxes, and other structures onto the substrate. For example, in an aircraft interior, a substrate panel may incorporate a standing rib having a thickness and height suitable for mounting the attachment component thereon. Alternately, the substrate panel may have one or more openings such as a lightening hole formed therein with a position and size to form an inner diameter exposed edge defined by the thickness of the substrate panel, wherein this exposed edge provides a convenient site for mounting of the attachment component. However, attachment components designed for adjustable quick and easy connection as by adhesive attachment to the exposed substrate edge have not been available, particularly with respect to accommodating a range of different edge wall thicknesses.

There exists, therefore, a need for further improvements in and to attachment components of the type designed for mounting as by adhesive attachment onto a supporting substrate, and more particularly of the type designed for mounting onto an exposed edge of the substrate, wherein the improved attachment component is adapted to accommodate a range of different substrate edge wall thicknesses. The present invention fulfills these needs and provides further related advantages.

SUMMARY OF THE INVENTION

In accordance with the invention, an improved attachment component comprising an adjustable mounting bracket is provided for secure and stable mounting as by adhesive attachment onto an exposed edge of a supporting substrate, wherein the mounting bracket is adapted for quick and easy subsequent mounting of a selected structure such as tubing, wire bundles, etc., relative to the substrate. The adjustable mounting bracket comprises a pair of slidably interfitting bracket members each having a generally L-shaped configuration to cooperatively define a slidably overlying pair of mounting plates and an associated pair of slidably separable clamp jaw plates. The slidably interfitting mounting plates accommodate adjustable spaced-apart separation of the clamp jaw plates to seat firmly against opposed surfaces of the exposed substrate edge, such as mounting onto a rib protruding from the substrate or mounting onto an inner diameter edge of an opening formed in the substrate.

In one preferred form of the invention, a retainer such as a spring element or bushing retains the mounting plates in slidably overlying relation to accommodate variable spaced-apart positioning of the clamp jaw plates for reception of the exposed substrate edge, and to seat inboard-facing surfaces of the clamp jaw plates firmly against the opposed surfaces of the substrate edge. A bonding agent such as a curable epoxy, a pressure sensitive adhesive, or resilient pads coated with an adhesive agent is applied to the inboard surfaces of the clamp jaw plates for secure attachment of the adjustable bracket to the substrate. The retainer by itself or in combination with minor spring deflection of the bracket members retains the inboard surfaces of the clamp jaw plates seated firmly against the substrate for the duration of a bonding agent cure time, when a curable bonding agent is used.

The retainer further supports at least one fastener such as a threaded nut in alignment with a pair of fastener ports formed in the mounting plates of the adjustable bracket, and wherein at least one of these fastener ports comprises an elongated slot to accommodate variable spaced-apart positioning of the clamp jaw brackets within a range of different substrate edge wall thicknesses. The threaded nut is adapted for thread-in connection with a threaded bolt or screw used for connecting the selected structure such as a length of tubing, a bundle of wires, or the like to the mounting bracket. In an alternative form, the spring element may support other types of fasteners such as a threaded bolt or screw for subsequent connection with a threaded nut.

In one alternative preferred form of the invention, the retainer initially supports the mounting plates of the adjustable bracket in relatively loosely connected relation to permit one of the mounting plates to be swingably or pivotally displaced relative to the other. In this embodiment, a first clamp jaw plate can be seated firmly against one surface of the exposed substrate edge, followed by pivoting movement of the other or second clamp jaw plate into firmly seated contact with an opposite surface of the substrate edge. The retainer incorporates a fastener which can then be tightened for securely interconnecting the overlying mounting plates, thereby securely clamping the clamp jaw plates onto the exposed substrate edge. Additional mounting ports and/or related fasteners may be provided on at least one of the mounting plates for facilitated subsequent connection of a selected structure or structures thereto.

Other features and advantages of the present invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
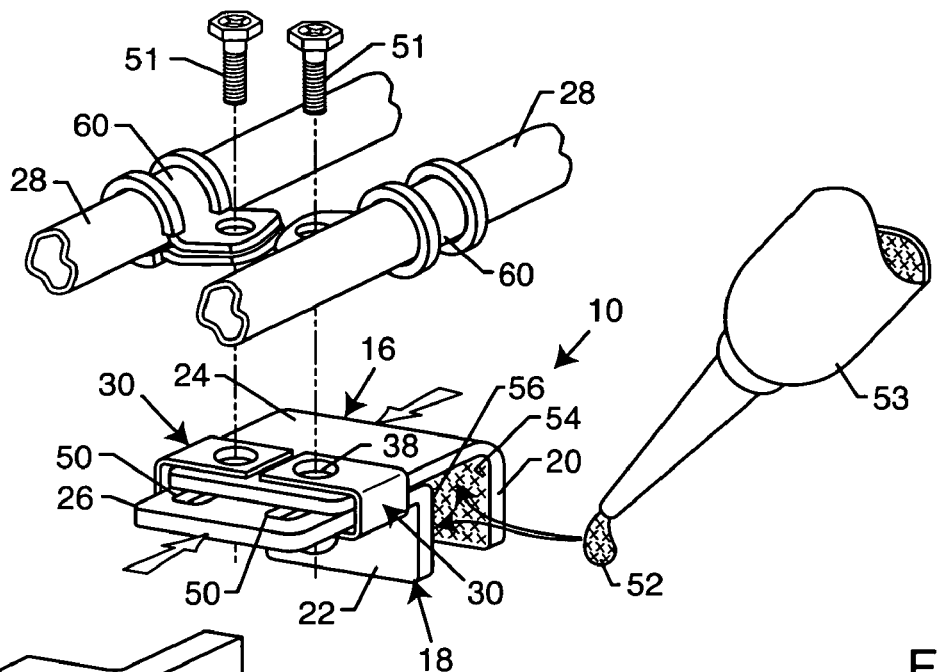
FIG. 1 is an exploded perspective view of an adjustable mounting bracket in accordance with one preferred form of the invention, for mounting onto an exposed edge of a substrate.

As shown in the exemplary drawings, an adjustable mounting bracket referred to generally in FIG. 1 by the reference numeral 10 is provided for quick and easy mounting as by adhesive connection onto an exposed edge 12 such as the illustrative standing rib formed on a substrate 14. The mounting bracket 10 includes a pair of adjustable bracket members 16 and 18 each having a generally L-shaped configuration and slidably nested one within the other to define a pair of clamp jaw plates 20 and 22 adapted for secure and stable adhesive attachment to opposed surfaces defined on the substrate rib or edge 12. The mounting bracket further includes a pair of slidably overlying mounting plates 24 and 26 adapted for convenient mounted support of one or more selected structures 28 such as lengths of tubing, wire bundles, or the like relative to the substrate 14.

Figure 2:
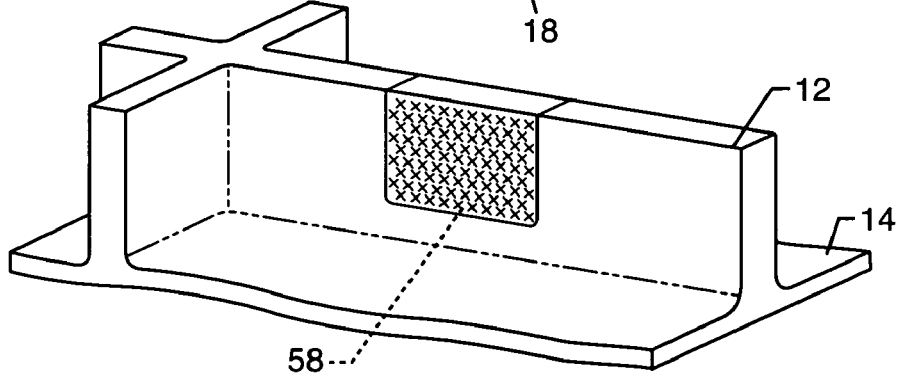
FIG. 2 is a sectional view showing the mounting bracket of FIG. 1 mounted onto the substrate edge.
Figure 2:
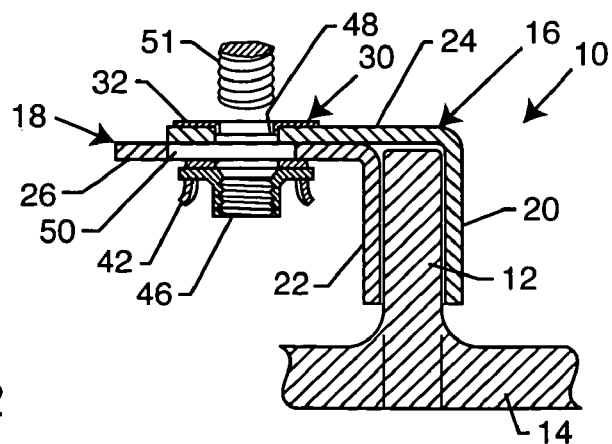

FIGS. 1–2 depict the adjustable mounting bracket 10 of the present invention in accordance with one preferred form, for use in secure and stable mounting of one or more selected auxiliary structures such as lengths of tubing 28 relative to the substrate 14. In this regard, the substrate 14 may comprise a relatively thin-walled panel or non-metal panel of the type used, e.g., in aircraft construction to incorporate an exposed edge such as the illustrative standing rib 12. The adjustable mounting bracket 10 comprises an attachment component designed for quick and easy mounting onto the exposed substrate edge 12, while accommodating a range of different edge wall thicknesses.

The adjustable mounting bracket 10 comprises the pair of generally L-shaped bracket members 16, 18 constructed from a suitable metal or nonmetallic material, and each having a generally L-shaped configuration. A first or outer bracket member 16 defines one of the clamp jaw plates 20 joined at one end thereof to the associated mounting plate 24 which extends from the clamp jaw plate generally at a right angle thereto. The second bracket member 18 defines an inner bracket member with its mounting plate 26 nested in slidable parallel relation at the underside of the outer mounting plate 24, thereby positioning the associated second clamp jaw plate 22 beneath the outer mounting plate 24 in slidably separable parallel relation with the outer clamp jaw plate 20. At least one retainer 30 is provided for retaining the two mounting plates 24, 26 in slidably overlying relation, to accommodate variable separation of the two clamp jaw plates 20, 22.

FIG. 1 illustrates a pair of retainers 30 for supporting the mounting plates 24, 26 of the adjustable bracket 10 in slidably overlying relation. Each retainer 30 may be formed as a nutplate or the like shown best in FIG. 3 to comprise a generally U-shaped clip formed from spring steel or the like to define spaced-apart upper and lower legs 32 and 34 protruding generally in parallel from a central segment 36. These upper and lower clip legs 32, 34 respectively incorporate a pair of aligned ports 38 and 40, and the lower clip leg 34 includes slotted wings 42 for receiving and supporting outwardly projecting tabs 44 on a fastener 46 such as the illustrative threaded nut. With this construction, each retainer clip 30 is sized and shaped for clip-on mounting over a side margin of the slidably overlying mounting plates 24, 26, for springably retaining the mounting plates 24, 26 in the desired slidably overlying relation.

In accordance with one aspect of the invention, the ports 38, 40 formed in each retainer clip 30 are aligned with a corresponding pair of fastener ports 48 and 50 (shown best in FIG. 2) formed respectively in the mounting plates 24, 26 for subsequent reception of a fastener element such as a threaded screw or bolt 51 (FIGS. 1–2) used for mounting the selected structure or structures 28 onto the adjustable bracket 10, as will be described in more detail herein. At least one of these fastener ports 48, 50, such as the fastener port 50 formed in the inner mounting plate 26 (FIG. 2), comprises an elongated slot having a long dimension extending in a direction generally normal to the plane of the associated clamp jaw plate 22.

In use, a suitable bonding agent 52 such as curable epoxy or the like is applied by means of a dispenser 53 or the like (FIG. 1) to the facing surfaces 54 and 56 of the two clamp jaw plates 20, 22. The spaced-apart separation of the two clamp jaw plates 20, 22 is then adjustably selected by appropriate sliding displacement of the two mounting plates 24, 26 relative to each other, with the retainer clips 30 supporting and retaining these mounting plates 24, 26 in close-fitting, slidably overlying and generally parallel relation. Importantly, a range of spaced-apart clamp jaw plate adjustment is defined by the lengths of the elongated fastener port slots 50 in the inner mounting plate 26, wherein these fastener port slots 50 are aligned with the fastener ports 48 formed in the overlying mounting plate 24.

The clamp jaw plates 20, 22 with bonding agent 52 thereon are firmly seated or landed against opposed surfaces of the standing rib 12 or other structure defining the substrate edge, as depicted by the dotted line landing zone 58 in FIG. 1. In this position, the inner bracket member 18 is adjustably positioned relative to the outer bracket member 16 by slidably displacing the inner mounting bracket 26 in a direction to seat and preferably squeeze or clamp the associated two clamp jaw plates 20, 22 firmly against the substrate rib 12. The retainer clip 30, or multiple clips 30 as viewed in FIG. 1, provide a degree of spring resistance to slidable retraction of the inner bracket member 18 and thereby effectively retain the two clamp jaw plates 20, 22 seated firmly against the substrate rib 12 with at least some positive engagement force for the duration of a bonding agent cure time. Alternately, or in addition, this spring retention force may be supplemented by a small degree of spring resilience provided by the bracket members 16, 18. Persons skilled in the art will recognize and appreciate that alternative adhesive materials may be used, such as a pressure sensitive adhesive, or resilient or elastomeric pads (not shown in FIGS. 1–2) coated with an adhesive agent, applied to the facing surfaces 54, 56 of the clamp jaw plates 20, 22 for secure attachment of the adjustable bracket 10 onto the substrate edge.

Following mounting of the adjustable bracket 10 onto the substrate edge, as described, the fastener 46 such as the threaded nut on each of the retainer clips 30 provides a convenient and readily accessible means for mounting of one or more selected structures 28 onto the mounting bracket 10, in a secure and stable manner relative to the substrate 14. FIG. 1 shows a pair of threaded fastener elements 51 such as threaded bolts or screws adapted for passage through the ports 38, 40 formed in the retainer clips 30, and for passage through the fastener ports 48, 50 formed in the mounting plates 24, 26, for thread-in engagement with the nuts 46 carried at the underside of the inner mounting plate 26. The central segment 36 of each retainer clip 30 engages a side margin of the overlying mounting plates 24, 26 to prevent significant rotation of the associated nut 46, as the fastener element 51 is advanced and tightened therewith. These fastener elements 51 may be used in combination with conventional tubing or wire tie straps 60 (FIG. 1) or the like for securely mounting lengths of tubing 28 relative to the substrate 14. Alternative forms and types of structures 28 suitable for mounting onto the bracket 10 by means of the fastener elements 51 will be apparent to persons skilled in the art.

Figure 3:
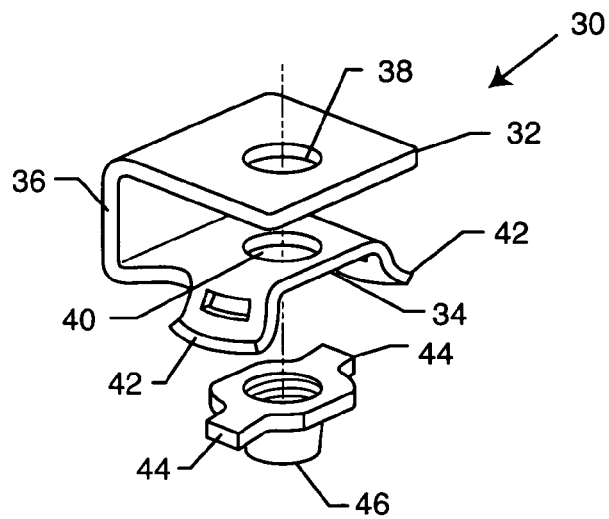
FIG. 3 is an exploded perspective view illustrating a threaded nut and associated retainer for use in the embodiment depicted in FIGS. 1–2.
Figure 4:
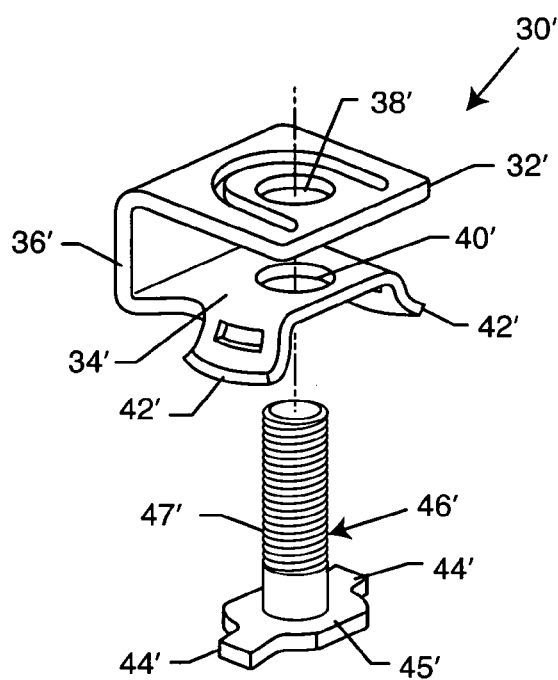
FIG. 4 is an exploded perspective view similar to FIG. 3 but depicting an alternative retainer and associated threaded fastener for use in the embodiment of FIGS. 1–2.

FIG. 4 illustrates one alternative preferred form of the invention, wherein a modified retainer 30' is adapted for supporting a different type of fastener 46', namely, for supporting a threaded bolt or screw in lieu of the threaded nut 46 as viewed in FIGS. 1–3. In this version, the modified retainer 30' has a generally U-shaped configuration including upper and lower clip legs 32' and 34' supported in generally parallel relation by means of a central segment 36'. The upper and lower clip legs 32, 34' respectively include an aligned pair of ports 38' and 40', and the lower clip leg 34' includes slotted wings 42' for receiving tabs 44' on a head 45 of the threaded bolt or screw 46'. The bolt or screw 46' includes a threaded shank 47 protruding upwardly through the clip ports 38', 40', and also through the associated fastener ports 48, 50 (not shown in FIG. 4) in the overlying mounting plates 24, 26 when the retainer 30' is clipped onto the bracket members 16, 18 in lieu of the retainer 30 as previously shown and described herein. The bolt or screw fastener 46' is used for supporting the selected additional structure 28 (not shown in FIG. 4) relative to the substrate, wherein such structure 28 may be retained thereon by means of an associated fastener element such as threaded nut.

Figure 5:
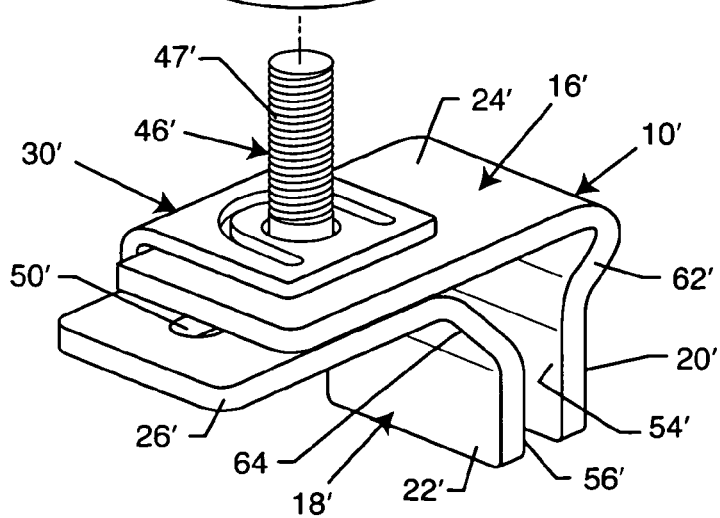
FIG. 5 is a perspective view showing one alternative preferred form of the adjustable mounting bracket of the present invention, incorporating the retainer shown in FIG. 4.

FIG. 5 illustrates the modified retainer 30' clipped onto a modified adjustable mounting bracket 10'. In this modified bracket 10', a pair of modified bracket members 16' and 18' each include transition segments extending angularly between the associated clamp jaw plate and mounting plate 20', 24' and 22', 26' to accommodate a bead, joggle, fillet, or other non-planar configuration such as a stand-off rib or the like (not shown in FIG. 5) at the free or upper end of the substrate edge 12. In addition, a single retainer clip 30' is used for slidably retaining the overlying pair of mounting plates 24', 26' in lieu of the pair of retainer clips 30 shown in FIG. 1.

More particularly, the two clamp jaw plate 20', 22' are respectively joined at their upper ends to a pair of transition segments 62 and 64 which extend upwardly therefrom and angularly away from the adjacent clamp jaw plate 20', 22' before joinder with the end of the associated mounting plate 24', 26'. These transition segments 62, 64 are thus spaced apart from each other by a distance greater than the spacing between the clamp jaw plates 20', 22', when the bracket 10' is installed as previously described onto a substrate edge 12. Accordingly, the facing surfaces 54', 56' of the clamp jaw plates may be seated firmly against and adhered onto the substrate edge 12, despite the presence of an enlarged bead or stand-off structure at the free or distal end of the substrate edge. The single retainer clip such as the modified clip 30' slidably supports the mounting plates 24', 26' for appropriate spaced-apart adjustment of the clamp jaw plates 20', 22', with the threaded bolt or screw 46' extending through fastener ports 48 and 50 in the mounting plates 24', 26' for mounting of a selected structure 28' thereon by means of a fastener element 51' such as the illustrative threaded nut.

Figures 6, 7:
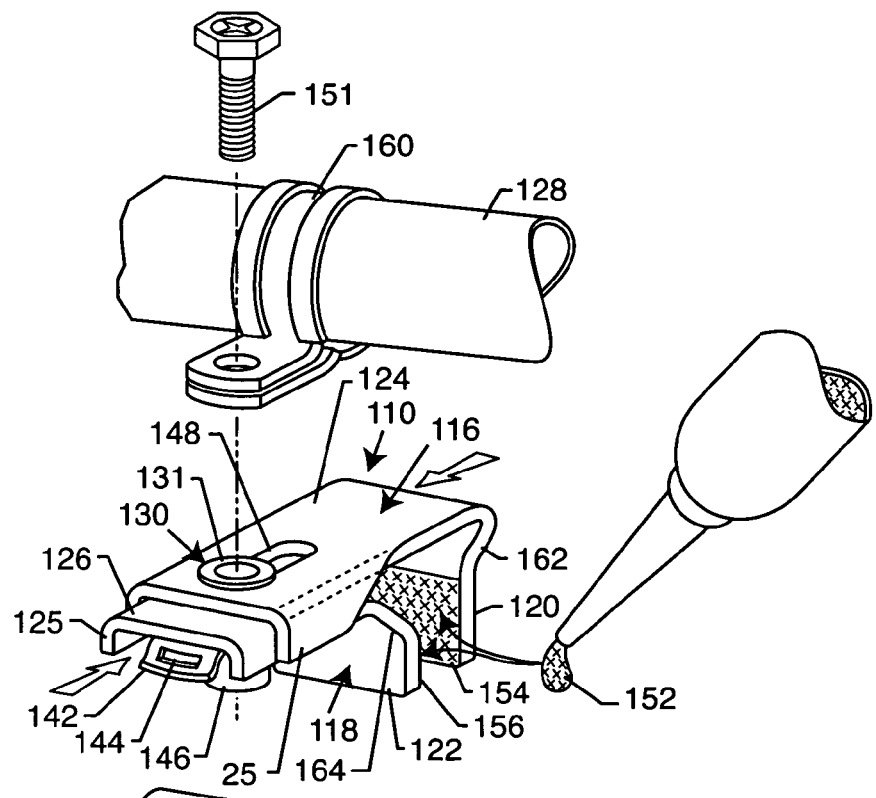
FIG. 6 is an exploded perspective view similar to FIG. 1, but showing another alternative preferred form of the invention.
FIG. 7 is an enlarged, partially exploded and fragmented perspective view showing the adjustable mounting bracket of FIG. 6.

FIGS. 6–7 depict another alternative preferred form of the invention, wherein components corresponding in structure and function with those previously described herein are identified by common reference numerals increased by 100. As shown, a modified adjustable mounting bracket 110 incorporates an alternative type of retainer 130 for supporting a pair of bracket members 116 and 118 in adjustable relation.

The modified bracket 110 (FIGS. 6–7) includes the nested pair of bracket members 116, 118 defining slidably separable clamp jaw plates 120, 122 and a corresponding pair of slidably overlying mounting plates 124, 126. The clamp jaw plates 120, 122 are joined with their respective mounting plates 124, 126 by means of angularly oriented transition segments 162, 164 to accommodate seated engagement of the facing surfaces 154, 156 of the clamp jaw plates against opposed surfaces of a substrate edge 112 such as the standing rib having an enlarged bead 13 at the distal or free end thereof. In addition, the upper mounting plate 124 includes a pair of down-turned side wings 25 for defining the opposite side margins of a downwardly open slide track within which the lower mounting plate 126 is slidably carried and guided. Alternative mating slide-fit track configurations formed on one or both of the mounting plates 124, 126 will be apparent to persons skilled in the art.

The modified retainer 130 shown in FIGS. 6–7 comprises a bushing having a flared upper end 131 engaging an upper surface of the upper mounting plate 124, and a sleeve-shaped body 133 (FIG. 7) fitted downwardly through a pair of fastener ports 148 and 150 formed respectively in the mounting plates 124, 126. FIGS. 6–7 show the upper port 148 in the form of an elongated slot in the upper mounting plate 124 oriented to extend generally normal or perpendicular to the planes of the clamp jaw plates 120, 122. By contrast, the lower port 150 comprises a circular aperture formed in the lower mounting plate 126. A lowermost end of the cylindrical body 133 of the retainer bushing 130 protrudes downwardly through the lower port 150 and includes or is otherwise attached as by press fitting into nut retainer 31 defining slotted wings 142 for receiving and supporting tabs 144 on a fastener 146 such as a threaded nut or the like.

The adjustable bracket 110 of FIGS. 6–7 is installed onto the substrate edge 112 in the same manner as previously described herein. A bonding agent 152 such as a curable epoxy, pressure sensitive adhesive, or the like is applied to the facing surfaces 154, 156 of the two clamp jaw plates 120, 122, and these adhesive-bearing surfaces are firmly pressed against the opposed surfaces of the substrate rib 112 as by engaging landing zones 158 depicted in dotted lines in FIG. 6. The two mounting plates 124, 126 are slidably adjustable relative to each other to accommodate firm pressed engagement of the clamp jaw plates 120, 122 with the substrate rib 112. The retainer bushing 130 and/or inherent spring characteristics of the bracket members 116, 118 effectively retains the two clamp jaw plates 120, 122 seated firmly against the substrate rib 112 with at least some positive engagement force for the duration of a bonding agent cure time, when a curable bonding agent is used. Thereafter, the fastener 146 such as the illustrative nut is adapted for thread-in reception of a mating fastener element 151 such a threaded bolt or screw for quick and easy mounting of a selected structure 128 such as the illustrative tubing mounted onto the bracket 110 by means of the strap 160. Downturned side wings 125 at the side margins of the lower mounting bracket 126 conveniently capture and retain the nut retainer 31 against rotation as the fastener element 151 is tightened therewith.

Figure 8:
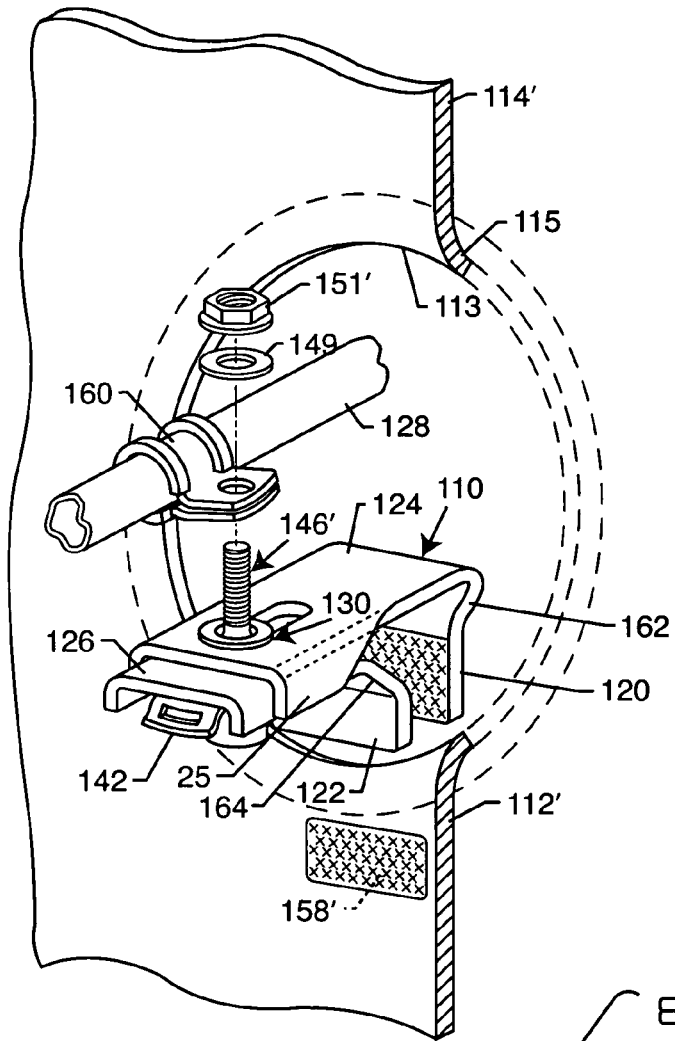
FIG. 8 is an exploded perspective view depicting the adjustable mounting bracket of FIG. 6 mounted onto a substrate edge defined by a flared inner diameter edge of an opening formed in the substrate.
Figure 9:
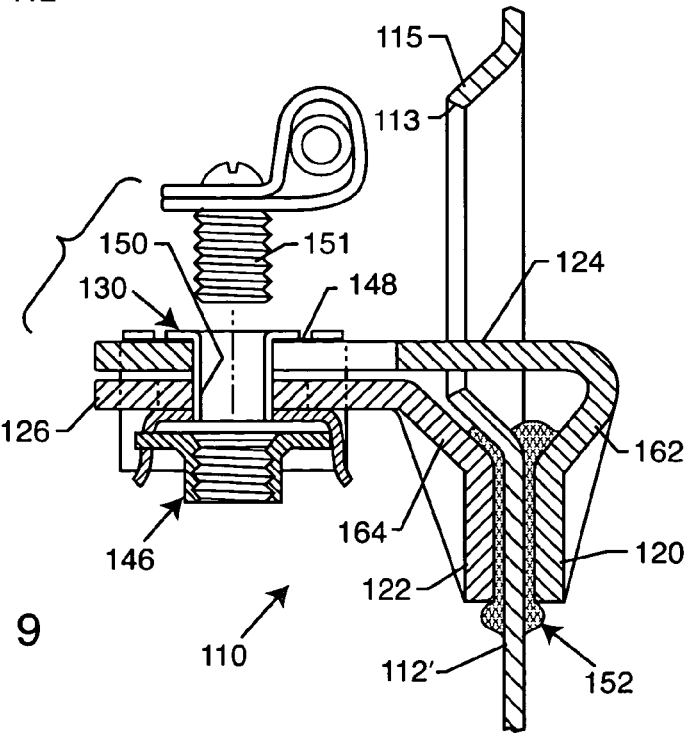
FIG. 9 is an enlarged sectional view showing the mounting bracket and substrate edge of FIG. 8, but including an alternative fastener carried by the mounting bracket.
Figure 10:
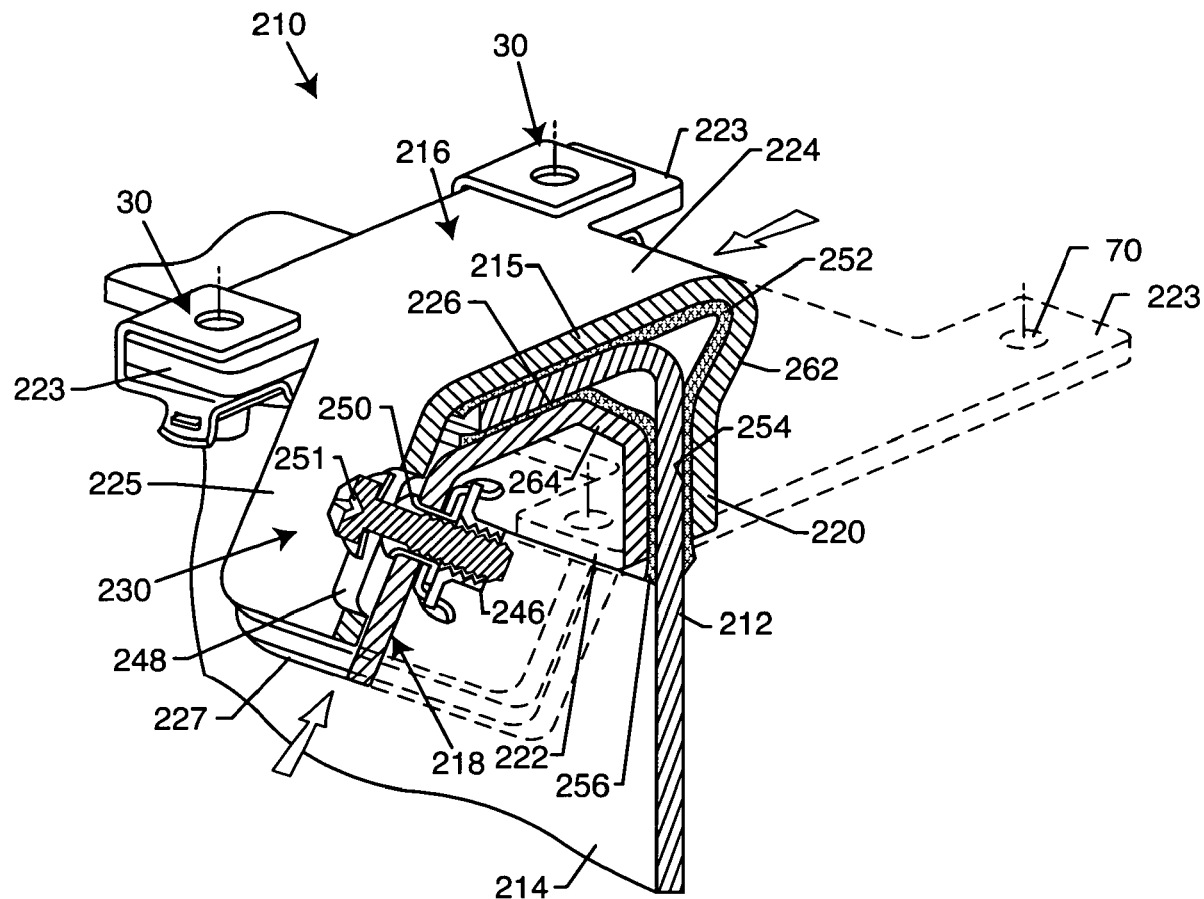
FIG. 10 is a fragmented perspective view illustrating a further alternative preferred form of the invention.

FIGS. 8–9 show the adjustable mounting bracket 110 of FIGS. 6–7 for quick and easy mounting onto an alternative substrate edge 112' such as the inner diameter of an opening 113 formed in a substrate 114'. In this arrangement, the substrate opening 113 may be lined with a flared stand-off or rim 115, with the transition segments 162, 164 of the bracket 110 permitting the clamp jaw plates 120, 122 to fit over this rim 115 for secure and stable engagement and adherence to opposed surfaces of the substrate 114 at landing zones 158' depicted in dotted lines in FIG. 8. FIG. 8 shows a bolt or screw-type fastener 146' may be carried by the bracket 110 for thread-on engagement with a mating fastener element 151' such as the illustrative threaded nut and washer 149 such as a spring washer or the like. FIG. 9 shows the nut-type fastener 146 of FIGS. 6–7 carried by the bracket 110 for thread-in engagement with a mating fastener element 151 such as the illustrative threaded bolt or screw.

A further alternative preferred form of the invention is depicted in FIGS. 10–15, wherein components corresponding in structure and function with those previously described herein are identified by common reference numerals increased by 200. As shown, a modified adjustable mounting bracket 210 incorporates a modified retainer 230 for supporting a pair of bracket members 216 and 218 for swinging or pivotal motion relative to each other, in a manner facilitating initial seated engagement of facing surfaces 254, 256 on a pair of clamp jaw plates 220, 222 against opposed surfaces of an exposed edge 212 on a substrate 214.

More specifically, an upper bracket member 216 includes the clamp jaw plate 220 joined by means of an upwardly angled transition segment 262 with an upper mounting plate 224 oriented generally at a right angle thereto. As viewed best in FIGS. 10–11, this upper mounting plate 224 includes at least one and preferably a plurality of wing tabs 223 each having a fastener port 70 formed therein. In addition, the upper mounting plate 224 is joined at its end opposite to the associated clamp jaw plate 220 with a central flap 225 which may be downturned from the plane of the upper mounting plate 224 by a selected angle, e.g., about 45° as shown.

A lower bracket member 218 has a generally conforming shape, namely, the clamp jaw plate 222 joined by means of an upwardly angled transition segment 264 with an associated lower mounting plate 226 oriented generally at a right angle thereto. This lower mounting plate 226 is joined at its end opposite to the associated clamp jaw plate 222 with a central flap 227 which also may be downturned from the plane of the lower mounting plate 226 by a selected angle, e.g., about 45° for nested conformance with the downturned angle of the flap 225 on the upper mounting plate 224.

The retainer 230 movably couples the flaps 225 and 227 of the two mounting plates 224, 226. As shown in the illustrative drawings, this retainer 230 may comprise a threaded fastener unit such as a threaded nut 246 for receiving a threaded bolt or screw 251 passed through aligned fastener ports 248 and 250 formed respectively in the overlying flaps 225, 227. As shown, one of these fastener ports 248, 250 comprises an elongated slot, such as the port 248 formed in the upper flap 225 as shown.

The retainer 230 initially supports the lower bracket member 218 relatively loosely from the upper bracket member 216. Accordingly, as viewed in FIGS. 11–12, the lower bracket member 218 may be swung or pivoted to orient an adhesive-bearing surface 256 of the associated clamp jaw plate 222 in a direction facing away from an adhesive-bearing surface 254 of the other clamp jaw plate 220. The illustrative drawings show the adhesive agent 252 on both of these components in the form of a resilient or elastomeric pad incorporating a suitable adhesive material such a pressure sensitive adhesive film or a bonding agent adapted for activation upon contact with a suitable solvent or the like. Alternately, a curable bonding agent of the type illustrated in FIGS. 1 and 6 may be used, if desired.

Figure 11:
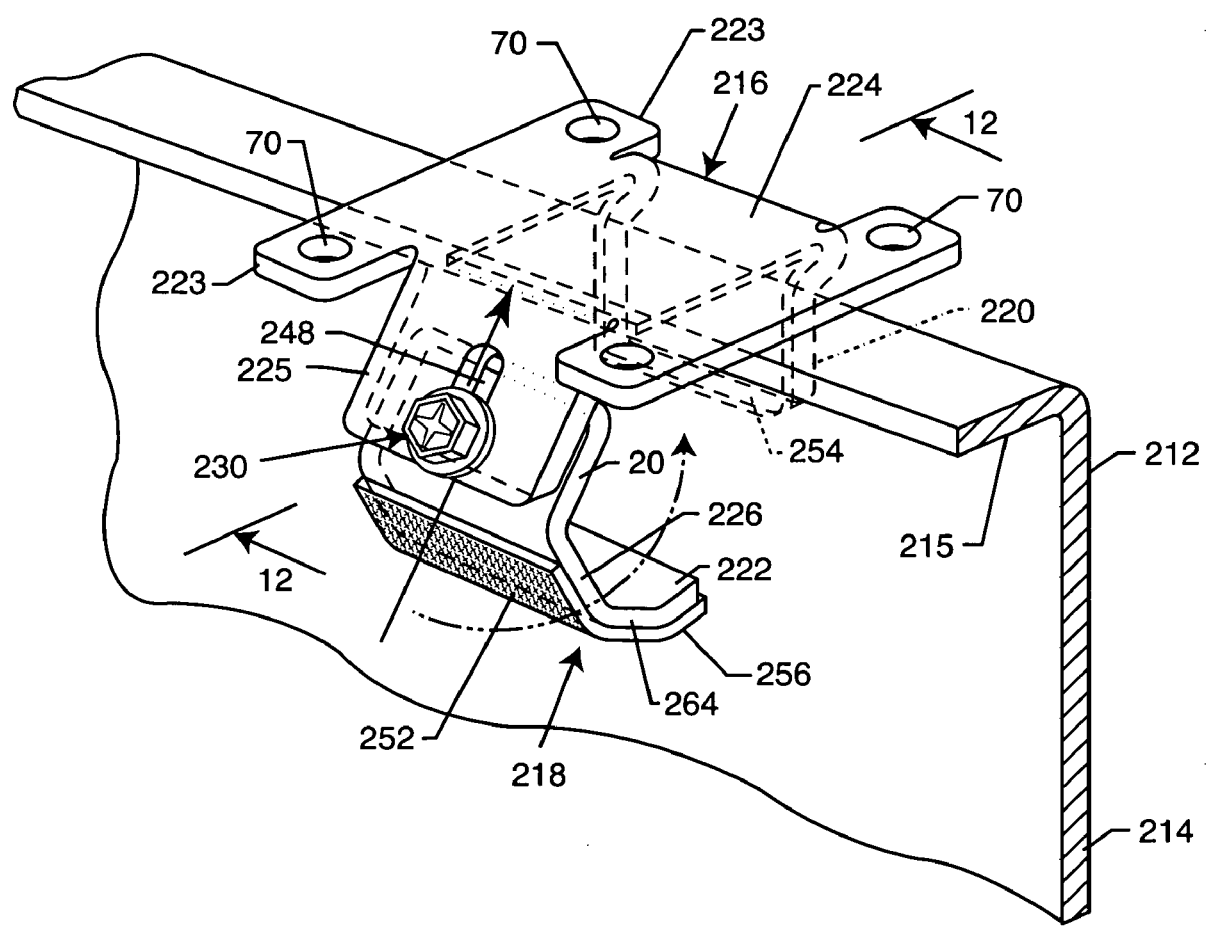
FIG. 11 is a fragmented perspective view similar to FIG. 10, but showing the adjustable mounting bracket in a preliminary configuration for facilitated mounting onto a substrate edge.
Figure 12:
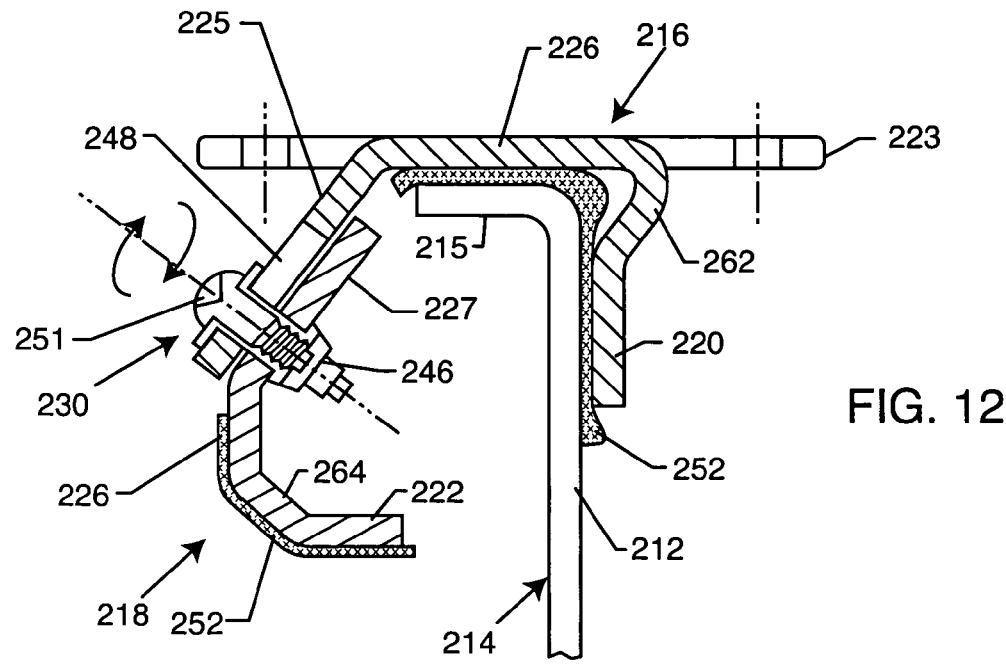
FIG. 12 is an enlarged sectional view taken generally on the line 12—12 of FIG. 11.
Figure 13:
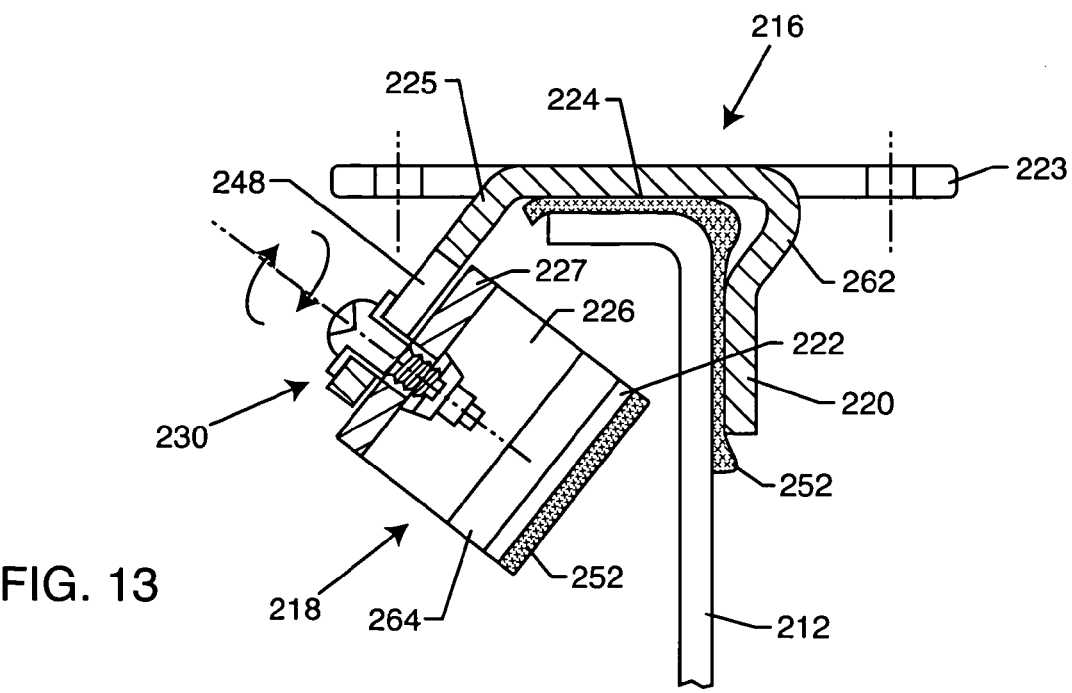
FIG. 13 is a sectional view similar to FIG. 12, but showing partial rotation of a movable clamp jaw member from an initial position as viewed in FIGS. 11–12 toward a final position adhered to the substrate.

The upper bracket member 216 of the adjustable bracket 210 is secured onto an exposed edge 212 of a substrate 214 by seating the adhesive-bearing surface 254 of the clamp jaw plate 220 firmly against one side of the substrate edge 212, as shown in FIGS. 11–12. In this regard, the substrate edge 212 may incorporate a turned rib 215, and the adhesive material 252 may be shaped to extend along an underside surface of the upper mounting plate 224 for adhering this mounting plate 224 to an upper surface of this rib 215.

Figure 14:
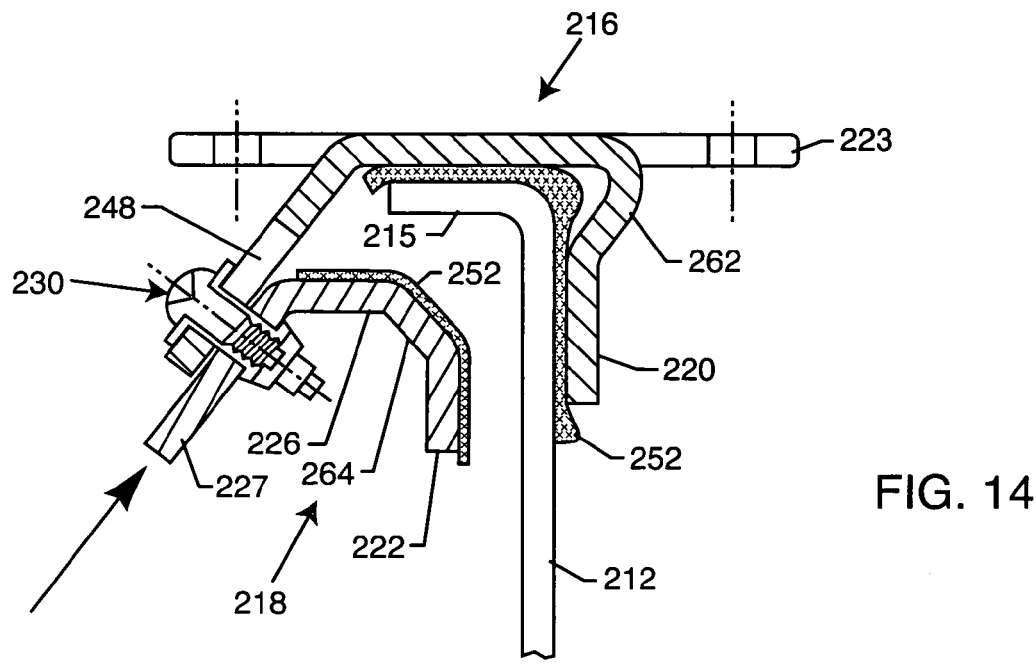
FIG. 14 is a sectional view similar to FIGS. 12–13, and depicting advancement of the movable clamp jaw member toward a final position adhered to the substrate.
Figure 15:
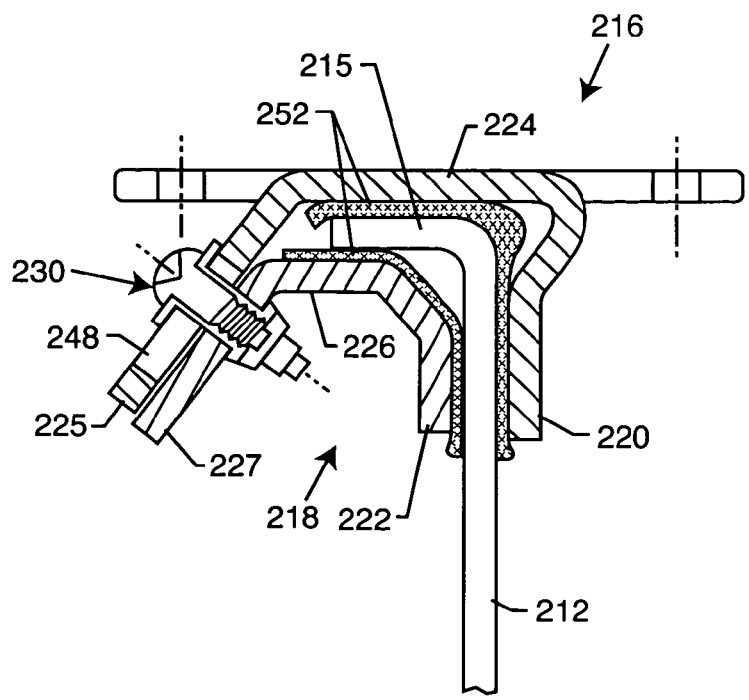
FIG. 15 is a sectional view similar to FIGS. 12–14, and illustrating the movable clamp jaw member in the final position adhered to the substrate.

The lower bracket member 218 is then swingably rotated (FIGS. 11–13) to re-orient the adhesive-bearing surface 256 of the second clamp jaw plate 222 in a direction facing toward the substrate edge 212, as viewed in FIG. 14. The adhesive material 252 lining this clamp jaw plate 222 may be shaped to extend along an upper surface of the lower mounting plate 226 for adhering the lower plate 226 to an underside surface of the rib 215 on the substrate edge 212. In this orientation, the lower bracket member 226 is slidably advanced within the limits of the slotted fastener port 248 for pressing the adhesive material 252 carried thereby into firm engagement with the substrate edge 212 (FIG. 15). When this firm and seated engagement is achieved, the retainer 230 can be tightened for securely locking or clamping the bracket members 216, 218 onto the substrate edge 212. Thereafter, any one of the fastener ports 70 formed in the bracket member 216 may be used for mounting of a selected structure (not shown in FIGS. 10–15) onto the bracket 210, relative to the substrate 214, as by means of a retainer clip 30 of the type shown and described in FIG. 3, or the like.

The adjustable mounting bracket of the present invention thus provides a simple and easy-to-use device for quick and easy mounting onto a free or exposed edge of a substrate, and for subsequent use in supporting one or more selected structures relative to the substrate.

Although an embodiment has been described in detail for purposes of illustration, various modifications may be made without departing from the scope and spirit of the invention. For example, persons skilled in the art will recognize and appreciate that the various features shown and described in any one of the alternative preferred forms of the invention shown and described herein may be employed any one of the other disclosed embodiments. Accordingly, no limitation on the invention is intended by way of the foregoing description and accompanying drawings, except as set forth in the appended claims.

What is claimed is:

1. An adjustable mounting bracket, comprising:
    a pair of bracket members each defining a mounting plate, and a clamp jaw plate oriented angularly relative to said mounting plate;
    at least one retainer for retaining said bracket members in generally nested relation with said mounting plates slidably interfitted and with said clamp jaw plates slidably separable;
    said clamp jaw plates respectively defining an adjustably spaced pair of facing surfaces for seating firmly against opposite sides of a substrate edge for mounting the bracket onto the substrate edge; and
    means for mounting a selected structure to the bracket, whereby said bracket supports the selected structure relative to the substrate edge.

2. The adjustable mounting bracket of claim 1 wherein said facing surfaces of said clamp jaw plates are adapted for adhesive mounting to the opposite sides of the substrate edge.

3. The adjustable mounting bracket of claim 1 further including bonding means for securing said clamp jaw plates to the substrate edge.

4. The adjustable mounting bracket of claim 3 wherein said bonding means comprising a curable bonding agent applied to said facing surfaces of said clamp jaw plates, said retainer retaining said facing surfaces of said clamp jaw plates in firm seated engagement with the opposite sides of the substrate edge for at least the duration of a cure time for said bonding agent.

5. The adjustable mounting bracket of claim 3 wherein said bonding means comprises a pressure sensitive adhesive applied to said facing surfaces of said clamp jaw plates.

6. The adjustable mounting bracket of claim 3 wherein said bonding means comprises an adhesive-coated resilient pad adhered to said facing surfaces of said clamp jaw plates.

7. The adjustable mounting bracket of claim 1 wherein each of said bracket members has a generally L-shaped configuration defining said mounting plate disposed substantially at a right angle to said clamp jaw plate.

8. The adjustable mounting bracket of claim 7 wherein each of said bracket members further includes a transition segment extending between said mounting plate and said clamp jaw plate in a direction angularly away from said facing surface.

9. The adjustable mounting bracket of claim 7 wherein each of said bracket members further includes a flap downturned angularly from the plane of said mounting plate, said retainer interconnecting said flaps.

10. The adjustable mounting bracket of claim 9 wherein said flap is downturned from said mounting plate at an angle of about 45°.

11. The adjustable mounting bracket of claim 9 further including a pair of fastener ports formed respectively in said flaps, at least one of said fastener ports comprising an elongated slot, said mounting means comprising a fastener receivable through said fastener ports.

12. The adjustable mounting bracket of claim 1 wherein said retainer comprises a retainer clip for retaining said mounting plates in slidably interfitted relation.

13. The adjustable mounting bracket of claim 12 wherein said mounting means comprises a first threaded fastener carried by said retainer clip.

14. The adjustable mounting bracket of claim 13 wherein said mounting means further comprises a second threaded fastener matingly engageable with said first threaded fastener for supporting the selected structure relative to the bracket.

15. The adjustable mounting bracket of claim 1 wherein said mounting plates each define a fastener port formed therein, at least one of said fastener ports comprising an elongated slot, said mounting means comprising a fastener receivable through said fastener ports.

16. The adjustable mounting bracket of claim 15 wherein said fastener comprises a threaded bolt.

17. The adjustable mounting bracket of claim 16 wherein said threaded bolt is matingly engageable with a threaded nut carried by said retainer.

18. The adjustable mounting bracket of claim 15 wherein said retainer comprises a bushing extending through said fastener ports.

19. The adjustable mounting bracket of claim 1 wherein said pair of bracket members comprise an outer bracket member and an inner bracket member, said mounting plate of said outer bracket member slidably overlying said mounting plate of said inner bracket member and including side wings defining a slide track for receiving and guiding said mounting plate of said inner bracket member.

20. The adjustable mounting bracket of claim 19 wherein said mounting plates of said outer and inner bracket members each define a fastener port formed therein, at least one of said fastener ports comprising an elongated slot, said mounting means comprising a fastener element at the underside of said mounting plate of said inner bracket member, said mounting plate of said inner bracket member including at least one side wing for engaging said fastener element to prevent rotation thereof.

21. The adjustable mounting bracket of claim 20 wherein said fastener element comprises a threaded nut.

22. The adjustable mounting bracket of claim 20 wherein said fastener element is carried by said retainer.

23. An adjustable mounting bracket, comprising:
- an upper bracket member defining a first mounting plate, and a first clamp jaw plate oriented generally normal to said first mounting plate;
- a lower bracket member second mounting plate, and a second clamp jaw plate oriented generally normal to said second mounting plate;
- means for retaining said upper and lower bracket members in generally nested relation with said first and second mounting plates slidably interfitted and with said first and second clamp jaw plates slidably separable;
- said first and second clamp jaw plates respectively defining an adjustably spaced pair of first and second facing surfaces for seating firmly against opposite sides of a substrate edge for mounting the bracket onto the substrate edge; and
- means for mounting a selected structure to the bracket, whereby said bracket supports the selected structure relative to the substrate edge.

24. The adjustable mounting bracket of claim 23 wherein said first and second facing surfaces of said first and second clamp jaw plates are adapted for adhesive mounting to the opposite sides of the substrate edge.

25. The adjustable mounting bracket of claim 23 wherein said upper bracket member further includes a first transition segment extending between said first mounting plate and said first clamp jaw plate in a direction angularly away from said first facing surface, and further wherein said lower bracket member further includes a second transition segment extending between said second mounting plate and said second clamp jaw plate in a direction angularly away from said second facing surface, said first and second transition segments extending respectively from said first and second clamp jaw plates in directions angularly away from each other.

26. The adjustable mounting bracket of claim 23 wherein said upper and lower bracket members respectively include a pair of first and second flaps downturned angularly from the planes of said first and second mounting plates, respectively, and further wherein said first and second flaps respectively define a pair of fastener ports formed therein with at least one of said fastener ports comprising an elongated slot, said retainer extending through said fastener ports for interconnecting said first and second flaps.

27. The adjustable mounting bracket of claim 26 wherein said mounting means is carried by said first and second mounting plates.

* * * * *